(12) United States Patent
Liu et al.

(10) Patent No.: US 11,126,042 B2
(45) Date of Patent: Sep. 21, 2021

(54) HORIZONTAL ELECTRIC FIELD TYPE DISPLAY PANEL, METHOD OF MANUFACTURING THE SAME, AND DISPLAY DEVICE

(71) Applicants: BEIJING BOE DISPLAY TECHNOLOGY CO., LTD., Beijing (CN); BOE Technology Group Co., Ltd., Beijing (CN)

(72) Inventors: Deqiang Liu, Beijing (CN); Xibin Shao, Beijing (CN); Feifei Wang, Beijing (CN); Hongming Zhan, Beijing (CN); Kaixuan Wang, Beijing (CN); Hao Liu, Beijing (CN); Lifeng Lin, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/613,332

(22) PCT Filed: Sep. 17, 2018

(86) PCT No.: PCT/CN2018/106001
§ 371 (c)(1),
(2) Date: Nov. 13, 2019

(87) PCT Pub. No.: WO2019/157815
PCT Pub. Date: Aug. 22, 2019

(65) Prior Publication Data
US 2020/0371399 A1    Nov. 26, 2020

(30) Foreign Application Priority Data

Feb. 13, 2018    (CN) .......................... 201810150987.3
Aug. 29, 2018    (CN) .......................... 201810996185.4

(51) Int. Cl.
*G02F 1/1337*    (2006.01)
*G02F 1/1343*    (2006.01)
(Continued)

(52) U.S. Cl.
CPC ...... *G02F 1/134363* (2013.01); *G02F 1/1337* (2013.01); *G02F 1/13394* (2013.01); *G02F 1/133528* (2013.01)

(58) Field of Classification Search
None
See application file for complete search history.

(56) References Cited

U.S. PATENT DOCUMENTS 7,227,602 B2    6/2007    Jeon et al.
8,040,486 B2    10/2011   Kumashiro et al.
(Continued)

FOREIGN PATENT DOCUMENTS

CN    1777834 A    5/2006
CN    1797196 A    7/2006
(Continued)

OTHER PUBLICATIONS

First Office Action, including Search Report, for Chinese Patent Application No. 201810996185.4, dated Mar. 30, 2020, 20 pages.

*Primary Examiner* — James A Dudek
(74) *Attorney, Agent, or Firm* — Westman, Champlin & Koehler, P.A.

(57) ABSTRACT

A horizontal electric field type display panel, a method of manufacturing the same, and a display device are provided in embodiments of the disclosure, the horizontal electric field type display panel including: a first substrate and a second substrate arranged opposite to each other; a liquid crystal layer between the first substrate and the second substrate; and a first compensation film layer between the first substrate and the second substrate, wherein the first (Continued)

compensation film layer is configured to compensate for a phase delay of an axial light in a condition that the display panel is subjected to a non-uniform external force.

13 Claims, 9 Drawing Sheets

(51) Int. Cl.
  *G02F 1/1335* (2006.01)
  *G02F 1/1339* (2006.01)

(56) References Cited

U.S. PATENT DOCUMENTS

| | | | |
|---|---|---|---|
| 8,476,351 B2 | 7/2013 | Yoshioka et al. | |
| 2005/0140900 A1 | 6/2005 | Jeon et al. | |
| 2007/0059612 A1 | 3/2007 | Yoshioka et al. | |
| 2007/0188696 A1 | 8/2007 | Kim et al. | |
| 2009/0015765 A1 | 1/2009 | Takiguchi et al. | |
| 2009/0135349 A1 | 5/2009 | Shibatani et al. | |
| 2010/0165256 A1 | 7/2010 | Moriya et al. | |
| 2010/0328599 A1 | 12/2010 | Kumashiro et al. | |
| 2015/0146142 A1 | 5/2015 | Kang et al. | |
| 2016/0342002 A1 | 11/2016 | Qin | |
| 2018/0052344 A1* | 2/2018 | Suwa | G02F 1/133707 |
| 2018/0224685 A1 | 8/2018 | Shao et al. | |
| 2019/0018272 A1 | 1/2019 | Zhao et al. | |
| 2019/0219871 A1* | 7/2019 | Kawahira | G02F 1/133723 |

FOREIGN PATENT DOCUMENTS

| | | |
|---|---|---|
| CN | 1814675 A | 8/2006 |
| CN | 1867636 A | 11/2006 |
| CN | 101118350 A | 2/2008 |
| CN | 101344606 A | 1/2009 |
| CN | 101382706 A | 3/2009 |
| CN | 101416103 A | 4/2009 |
| CN | 101469149 A | 7/2009 |
| CN | 102269897 A | 12/2011 |
| CN | 102692763 A | 9/2012 |
| CN | 102707483 A | 10/2012 |
| CN | 102768990 A | 11/2012 |
| CN | 103605239 A | 2/2014 |
| CN | 104216150 A | 12/2014 |
| CN | 104317106 A | 1/2015 |
| CN | 104330926 A | 2/2015 |
| CN | 104714330 A | 6/2015 |
| CN | 105842927 A | 8/2016 |
| CN | 106019720 A | 10/2016 |
| CN | 106773215 A | 5/2017 |
| CN | 108089377 A | 5/2018 |
| CN | 108303830 A | 7/2018 |
| CN | 207780436 U | 8/2018 |
| CN | 207799298 U | 8/2018 |
| KR | 20080034659 A | 4/2008 |
| KR | 20110138571 A | 12/2011 |

* cited by examiner

HORIZONTAL ELECTRIC FIELD TYPE DISPLAY PANEL, METHOD OF MANUFACTURING THE SAME, AND DISPLAY DEVICE

CROSS-REFERENCE TO RELATED INVENTION

This application is a Section 371 National Stage Application of International Application No. PCT/CN2018/106001, filed on Sep. 17, 2018, entitled "HORIZONTAL ELECTRIC FIELD TYPE DISPLAY PANEL, METHOD OF MANUFACTURING THE SAME, AND DISPLAY DEVICE", which claims priority to Chinese Patent Application Invention No. 201810150987.3 filed on Feb. 13, 2018, and Chinese Patent Application Invention No. 201810996185.4 filed on Aug. 29, 2018, in the China National Intellectual Property Administration, the whole disclosure of which is incorporated herein by reference.

BACKGROUND OF THE DISCLOSURE

Field of the Disclosure

Embodiments of the present disclosure generally relate to the technical field of display technology, and in particular, to a horizontal electric field type display panel, a method of manufacturing the same, and a display device.

Description of the Related Art

More or less stress may be induced in a first substrate and a second substrate of a horizontal electrical field type liquid crystal display panel, and in turn an optical anisotropy may also be induced in the first substrate and the second substrate, when the horizontal electrical field type liquid crystal display panel implements a curved display in various ways, or is subjected to pressure; and when a polarized light passes through a base substrate having optical anisotropy, a polarization state of the polarized light may be changed, such that various degrees of light leakage of the display panel may be incurred in a dark state of the display panel.

SUMMARY OF THE DISCLOSURE

The embodiments of the present disclosure have been made to overcome or alleviate at least one aspect of the above mentioned disadvantages and/or shortcomings in the prior art, by providing a horizontal electric field type display panel, a method of manufacturing the same, and a display device.

Following technical solutions are adopted in exemplary embodiments of the disclosure.

According to one aspect of embodiments of the disclosure, there is provided a horizontal electric field type display panel, comprising:

a first substrate and a second substrate arranged opposite to each other;

a liquid crystal layer between the first substrate and the second substrate; and a first compensation film layer between the first substrate and the second substrate, wherein the first compensation film layer is configured to compensate for a phase delay of an axial light in a condition that the display panel is subjected to a non-uniform external force.

In an implementation of the disclosure, a direction of an optical axis of the first compensation film layer is parallel to a direction of an initial optical axis of liquid crystal molecules in the liquid crystal layer; and a sum of an optical path difference of the first compensation film layer and an optical path difference of the liquid crystal layer is an integral multiple of a wavelength of an incident light.

In an implementation of the disclosure, the sum of the optical path difference of the first compensation film layer and the optical path difference of the liquid crystal layer is the wavelength of the incident light.

In an implementation of the disclosure, a direction of an optical axis of the first compensation film layer is perpendicular to a direction of an initial optical axis of liquid crystal molecules in the liquid crystal layer; and a difference between an optical path difference of the first compensation film layer and an optical path difference of the liquid crystal layer is an integral multiple of a wavelength of an incident light.

In an implementation of the disclosure, the optical path difference of the first compensation film layer is equal to the optical path difference of the liquid crystal layer.

In an implementation of the disclosure, the first compensation film layer is a+A compensation film layer.

In an implementation of the disclosure, the first compensation film layer has a thickness of 1 μm~5 μm.

In an implementation of the disclosure, the display panel further comprises:

a color film layer on a side of the first substrate facing towards the liquid crystal layer;

a planarization layer on a side of the color film layer facing towards the liquid crystal layer; and a spacer layer on a side of the planarization layer facing towards the liquid crystal layer;

wherein the first compensation film layer is multiplexed as the planarization layer between the color film layer and the spacer layer.

In an implementation of the disclosure, the display panel further comprises:

a second compensation film layer on a light-emergent side of the liquid crystal layer and the first compensation film layer, and configured to compensate for a phase delay of a non-axial light.

In an implementation of the disclosure, the second compensation layer is a+C compensation film layer or a−C compensation film layer.

In an implementation of the disclosure, the second compensation film layer has a thickness of 0.5 μm~5 μm.

In an implementation of the disclosure, the second compensation film layer has a phase delay amount of 92 nm~300 nm in a thickness direction thereof.

In an implementation of the disclosure, the first compensation film layer and the second compensation film layer are located on one and the same side of the liquid crystal layer, and the second compensation film layer is located on a side of the first compensation film layer facing away from the liquid crystal layer.

In an implementation of the disclosure, the first compensation film layer is located on a side of the first substrate facing towards the liquid crystal layer; and the second compensation film layer is located on a side of the first substrate facing towards the liquid crystal layer or on a side of the first substrate facing away from the liquid crystal layer.

In an implementation of the disclosure, the second compensation film layer is located on a side of the first substrate facing away from the liquid crystal layer.

In an implementation of the disclosure, the display panel further comprises:

a color film layer on the side of the first substrate facing towards the liquid crystal layer; and a spacer layer on a side of the color film layer facing towards the liquid crystal layer;

wherein the second compensation film layer functions as a planarization layer between the color film layer and the spacer layer, and the first compensation film layer is located between the second compensation layer and the spacer layer.

In an implementation of the disclosure, the planarization layer has a thickness of 0.8 µm~2.5 µm.

In an implementation of the disclosure, the first compensation film layer has a viscosity of 1.0 MPa·s~15 MPa·s prior to its curing.

In an implementation of the disclosure, the second compensation film layer has a viscosity of 1.5 MPs·s~20 MPs·s prior to its curing.

In an implementation of the disclosure, the first compensation film layer and the second compensation film layer are located on different sides of the liquid crystal layer.

In an implementation of the disclosure, the first compensation film layer is located on a side of the second substrate facing towards the liquid crystal layer; and the second compensation film layer is located on a side of the first substrate facing towards the liquid crystal layer or on a side of the first substrate facing away from the liquid crystal layer.

In an implementation of the disclosure, the first compensation film layer is located on a side of the second substrate facing towards the liquid crystal layer; and the second compensation film layer is located on a side of the first substrate facing away from the liquid crystal layer. In an implementation of the disclosure, in response to the second compensation film being located on a side of the first substrate facing away from the liquid crystal layer, the second compensation film functions as an upper polarizer.

In an implementation of the disclosure, the second compensation film layer has a plurality of spacers protruding towards the liquid crystal layer.

In an implementation of the disclosure, both the first compensation film layer and the second compensation film layer are liquid crystal films.

In an implementation of the disclosure, the display panel further comprises: an alignment layer located on the side of the first compensation film facing away from the liquid crystal layer and adjacent to the first compensation film layer.

In an implementation of the disclosure, the second substrate is an array substrate.

According to another aspect of the exemplary embodiment of the present disclosure, there is provided a display device, comprising the horizontal electric field type display panel as above.

According to another aspect of the exemplary embodiment of the present disclosure, there is provided a method of manufacturing the horizontal electric field type display panel as above, comprising:

providing the first substrate and the second substrate;

forming the first compensation film layer having an alignment direction, by coating a liquid containing a material for forming the first compensation film layer, on the first substrate or the second substrate, and by in turn performing a pre-baking on the liquid; and filling a space between the first substrate and the second substrate with the liquid crystal layer.

In an implementation of the disclosure, the method further comprises:

forming a second compensation film layer configured to compensate for a phase delay of a non-axial light, by coating a liquid containing a material for forming the second compensation film layer, on the first substrate or the second substrate, and by in turn performing a pre-baking on the liquid.

In an implementation of the disclosure, after performing the pre-baking on the liquid, the method further comprises: irradiating the liquid for 30 s~60 min, with a ultraviolet light having a wavelength of 365 nm and a light intensity of 0.5 mw/cm$^2$~600 mw/cm$^2$.

In an implementation of the disclosure, prior to irradiating the liquid with the ultraviolet light having the wavelength of 365 nm, the method further comprises: irradiating the liquid for 30 s~60 min, with a ultraviolet light having a wavelength of 254 nm and a light intensity of 0.5 mw/cm$^2$~600 mw/cm$^2$.

BRIEF DESCRIPTION OF THE DRAWINGS

The drawings are used to provide a further understanding of the technical scheme of the present disclosure embodiments and form part of the specification. The drawings, together with the embodiments of the present application, are used to explain the technical solution of the present disclosure embodiments, but fail to constitute a limitation on the technical solution of the present disclosure embodiments. Shapes and sizes of various components in the drawings do not reflect the true proportions, and are intended only to illustrate the contents of the present disclosure.

DETAILED DESCRIPTION OF PREFERRED EMBODIMENTS OF THE INVENTION

IPS (i.e., "in plane switching") and ADS (i.e., "advanced super dimension switch") are common display modes of wide view LCD panels, also known as horizontal electric field type liquid crystal display panel.

Figure 1:
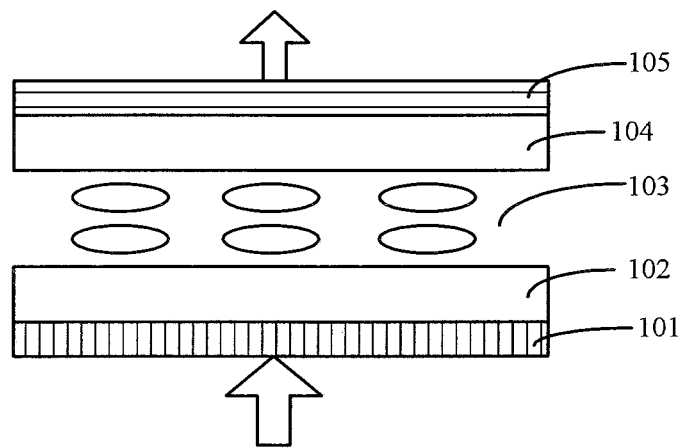
FIG. 1 is a schematic structural view of a liquid crystal display panel in relevant art.

As shown in FIG. 1, by way of example, an ADS type LCD is illustrated in detail, comprising: a first substrate 104 and a second substrate 102, and a liquid crystal layer 103 between the first substrate 104 and the second substrate 102. An upper polarizer 105 and a lower polarizer 101 whose light transmission axes are perpendicular to each other are provided respectively at external sides of the first substrate 104 and the second substrate 102. The LCD panel also needs to be provided with a backlight source. Light emitted by the backlight source is sequentially emitted outwards through the lower polarizer 101, the second substrate 102, the liquid crystal layer 103, the first substrate 104 and the upper polarizer 105. For example, the first substrate 104 may be a color filter substrate, and the second substrate 102 may be an array substrate.

An initial orientation (i.e., a direction of an initial optical axis) of the liquid crystal is defined as an orientation of liquid crystal molecules in a non-driving state in which the display panel is not curved or is not subjected to a pressure; then, an initial state of the liquid crystal molecules in the ADS type LCD is that the liquid crystal molecules are uniformly oriented to be substantially parallel to surfaces of the first substrate and the second substrate. In the non-driving state of the liquid crystal molecules in which no voltage is applied thereon, the liquid crystal has no distortion effect on light rays, that is to say, a polarization direction of the light passing through the liquid crystal layer in said non-driving state is considered to maintain unchanged; then, the polarization direction of the light passing through the liquid crystal remains the direction of the light transmission axis of the lower polarizer 101, i.e., being perpendicular to the direction of the light transmission axis of the upper polarizer 105, therefore, the light fails to pass through the upper polarizer 105 and in turn fails to exit the display panel, and the display panel then displays dark pictures such that the ADS type LCD is in a dark state. In a driving state of the liquid crystal molecules in which a voltage is applied thereon, the liquid crystal molecule rotates to distort the light, thus changing the polarization direction of the light, such that the light is capable of exiting the upper polarizer 105, so as to display bright pictures. At this time, the ADS type LCD is in a bright state.

Since respective base substrates of the second substrate 102 and the first substrate 104 are generally formed by glass, and glass intrinsically has birefringence effect on light rays, then, in a condition that glass is subjected to a non-uniform external force when the display panel is bent or pressed, the glass will transit from being an optical isotropic medium to being an optical anisotropic medium and will then produce a non-uniform stress birefringence due to different stress conditions, resulting in a change in the polarization state of the light transmitted therethrough. For example, when the display panel is under stress (e.g., being subjected to a bending force), an upper glass substrate and a lower glass substrate formed by one and the same glass material are usually subjected to tension-compression in opposite directions respectively or compression-tension in opposite directions respectively, resulting in opposite signs of their respective stress optical coefficients; i.e., the polarization state incurred by the upper glass substrate is opposite in direction to that incurred by the lower glass substrate, and in the absence of the liquid crystal layer 103, then the polarization state incurred by the upper glass substrate and that incurred by the lower glass substrate may cancel each other due to opposite optical rotation effects of the upper glass substrate and the lower glass substrate, that is to say, the optical delays incurred by the upper glass substrate and the lower glass substrate respectively may at least partially be canceled by each other; and further, if their respective optical rotation degrees are the same as each other, the polarization state incurred by the upper glass substrate and the polarization state incurred by the lower glass substrate are equal in magnitude of phase but are opposite in direction, such that they may cancel each other out completely, and the optical delays incurred respectively may cancel each other out completely. However, by way of example, due to the existence of the liquid crystal layer 103 arranged therebetween, a phase difference and an optical path difference will actually be magnified such that, by way of example, generally speaking, even it may not be guaranteed that respective directions of the polarization state incurred by the upper glass substrate and the polarization state incurred by the lower glass substrate are opposite to each other, then the polarization state incurred by the upper glass substrate and the polarization state incurred by the lower glass substrate fail to cancel each other out.

Figure 2:
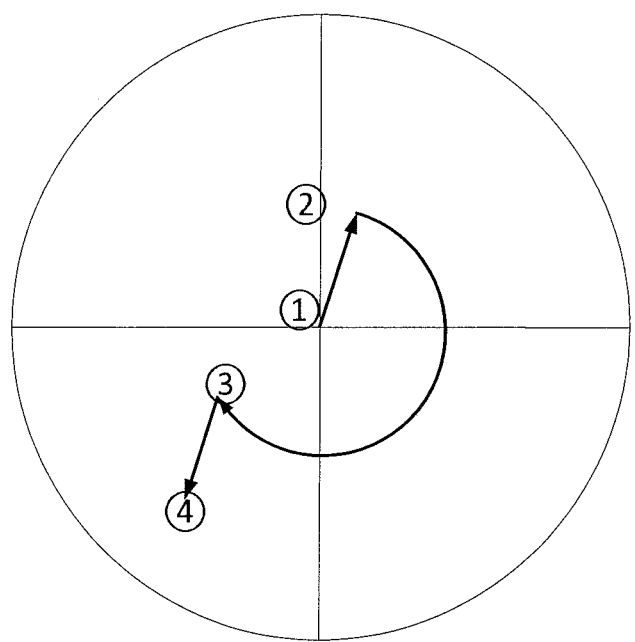
FIG. 2 is a schematic view of polarization states of light passing through various layers of the liquid crystal display panel in relevant art, illustrated on a Poincare Sphere.

Specifically, polarization states of light which is emitted by the backlight source and passes through components of the display panel in the dark state is shown in FIG. 2, illustrated on a Poincare Sphere. A point on the Poincare Sphere represents a respective one of polarization states, with an azimuth representing a respective longitude on the Poincare Sphere and an ellipticity representing respective latitude on the Poincare Sphere. Therefore, points on an equator of the Poincare Sphere represent linearly polarized light, upper and lower poles correspond to right-handed and left-handed circularly polarized light respectively, and other points on a spherical surface of the Poincare Sphere correspond to elliptically polarized light among which points of the upper hemisphere represent right-handed elliptically polarized light and points of the lower hemisphere represent left-handed elliptically polarized light, respectively. The spherical surface of the Poincare Sphere represents completely polarized light, the center of the Poincare Sphere represents natural light, and other points inside the Poincare Sphere represent partially polarized light.

Various stages/processes of the polarization states of the light emitted by the backlight source (for example, such a light is considered as natural light) when passing through the liquid crystal display panel on the Poincare Sphere are set forth respectively as follows: after passing through the lower polarizer 101, the light becomes a linearly polarized light, which is located at point ①; after passing through the glass material of the base substrate of the lower second substrate 102 which abuts against the lower polarizer 101 and produces a non-uniform stress therein, a change occurs in the polarization state of the light and more specifically, the light transits from the linearly polarized light to an elliptically polarized light which is located at position ②, due to the action of the optical rotation effect of glass; and since the light entering the liquid crystal at this moment is an elliptically polarized light whose optical axis is not parallel to the optical axis of the liquid crystal, rather than a linearly polarized light parallel or perpendicular to an orientation of the liquid crystal, then, it will be modulated by the optical rotation effect of the liquid crystal so as to induce a change in the polarization state thereof such that the polarization state is at position ③; and then, after passing through the glass material of the base substrate of the upper first substrate 104 which abuts against the upper polarizer 105 and produces a non-uniform stress, the polarization state moves to position ④ due to the optical rotation effect of the glass, and the position ④ will not coincide with position ①. It may be seen that, the light after being subjected to three times of optical rotation effects has been deviated far away from the original light. Then part of the light will leak out, which will bring about a light leakage problem in the dark state within the ADS type LCD. However, a TN type LCD and a VA type LCD do not have the problem of light leakage in the dark state due to a difference in respective arrangements of the initial orientation of liquid crystal molecules.

Based on this, according to a general inventive concept of embodiments of the disclosure, a display panel, a method of manufacturing the same, and a display device are provided, which are used to alleviate the problem of light leakage of the relevant horizontal electric field type liquid crystal display panel in the dark state. In order to make the purposes, technical solutions and advantages of the disclosure clearer, the disclosure will be further described in detail below in combination with the drawings. It is apparent that, the embodiments as described are merely part of embodiments of the disclosure, rather than inclusive of all possible embodiments of the disclosure. In the specification, same or similar reference numerals indicate same or similar components. The following description of embodiments of the present disclosure with reference to the accompanying drawings is intended to explain the general inventive concept of the present disclosure, and should not be construed as a limitation of the present disclosure. In addition, in the following detailed description, for the convenience of explanation, many specific details are set forth so as to provide a comprehensive understanding of the embodiments disclosed herein. However, it is apparent that, one or more embodiments may for example also be implemented, for example, without these specific details. Based on embodiments of the present disclosure, all other embodiments obtained by those skilled in the art without creative labor may fall within the scope of protection of the present disclosure. In other cases, well-known structures and devices are illustrated to simplify the accompanying drawings.

Respective dimension and shape of each component in the drawings are only intended to exemplarily illustrate the contents of the disclosure, rather than to demonstrate the practical dimension or proportion of components of the horizontal electric field type display panel and the display device in the embodiment of the present disclosure.

Figure 3:
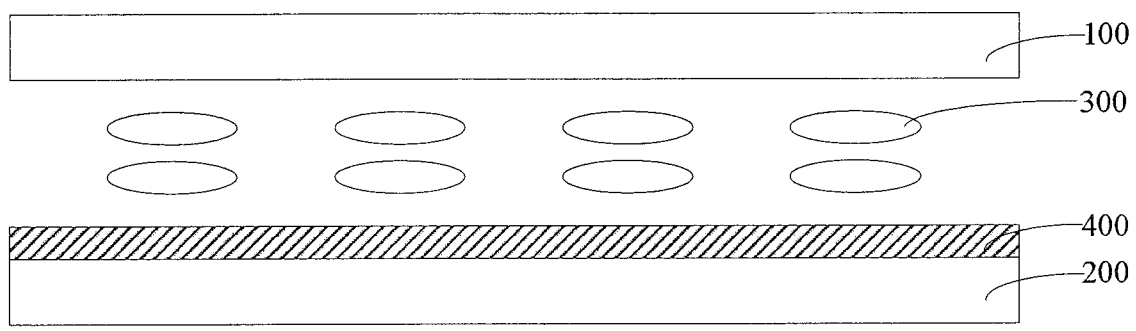
FIG. 3 is a schematic structural view of a display panel according to embodiments of the present disclosure.
Figure 4:
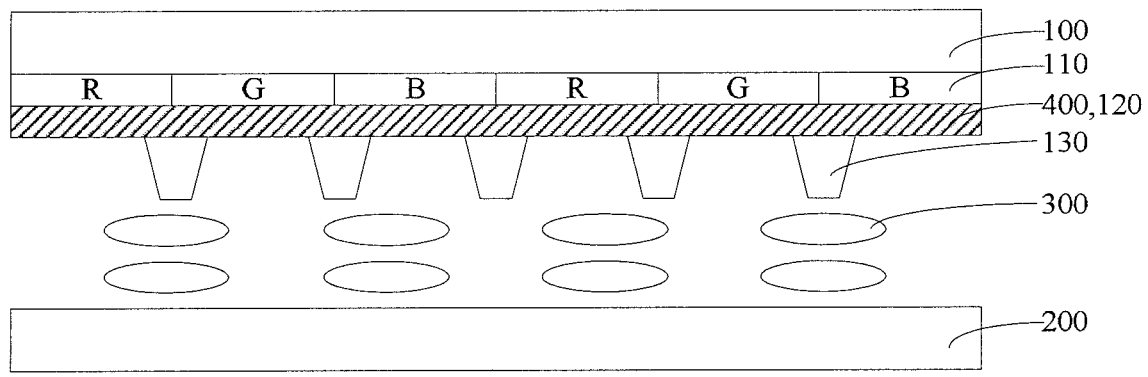
FIG. 4 is a schematic structural view of a display panel according to some other embodiments of the present disclosure.

In one aspect of embodiments of the disclosure, a horizontal electric field type display panel is provided, as illustrated in FIG. 3 and FIG. 4, comprising: a first substrate 100 and a second substrate 200 arranged opposite to each other; a liquid crystal layer 300 between the first substrate 100 and the second substrate 200; and a first compensation film layer 400 between the first substrate 100 and the second substrate 200, wherein the first compensation film layer 400 is configured to compensate for a phase delay of an axial light in a condition that the display panel is subjected to a non-uniform external force.

For example, the first substrate 104 may be a color filter substrate, and the second substrate 102 may be an array substrate.

An axial direction refers to a direction perpendicular to the display screen; therefore, an axial light refers to a light incident in the direction perpendicular to the display screen.

Specifically, in aforementioned display panel according to the embodiment of the present disclosure, a first compensation film layer 400 is provided between the first substrate 100 and the second substrate 200, which compensates for the phase delay of the axial light in a condition that the display panel is subjected to a non-uniform external force. As such, when an optical anisotropy is induced in each of the first substrate and the second substrate in a condition that the first substrate 100 and the second substrate 200 are subjected to respective non-uniform external forces respectively, and in turn a change occurs in the polarization state of the light passing therethrough, the first compensation film layer 400 is capable of compensating for the phase delay of the polarized light passing through the liquid crystal layer 300, such that the light may return to a certain extent towards its original polarization state after passing through the first substrate 100, the second substrate 200, the liquid crystal layer 300 and the first compensation film layer 400. As such, most of the light fails to exit the display panel in a condition of the dark state, thus improving the problem of light leakage in the dark state.

Specifically, in order to implement a compensation for the phase delay of the polarized light passing through the liquid crystal layer 300 by the first compensation layer 400, for example, the compensation may be implemented by at least two ways as set forth hereinafter:

A forward compensation (or referred to as a reset by superposition), specifically comprising: the polarization state of the light changes from "a polarization state ② of the light after passing through the glass of the second substrate 200 which abuts against the lower polarizer but prior to entering the liquid crystal layer 300" to "a polarization state ④ of the light after passing through the first compensation layer 400 but prior to entering the glass of the upper first substrate 100 which abuts against the upper polarizer", by applying an optical rotation effect onto the light, in the same direction as a direction of a variation tendency of the polarization state of the light on the Poincare Sphere around the center of the Poincare Sphere (that is to say, the first compensation film layer 400 is set to have its optical axis direction (i.e., the direction of is optical axis) parallel to a direction of an initial optical axis of the liquid crystal molecules in the liquid crystal layer 300), and the change of the polarization state of the light from the polarization state ② to the polarization state ④ is specifically set forth as follows: a change of the polarization state of the light in the first compensation film layer 400 and a change of the polarization state of the light in the liquid crystal layer 300 are superposed/combined together such that, the change of the polarization state of the light during a period from the polarization state ②, through a polarization state ③ of the light after being modulated by the optical rotation effect of the liquid crystal layer 300, and then to the polarization state ④ is that the polarization state of the light rotates at least one full circle on the Poincare Sphere around the center thereof in the same direction as the direction of a variation tendency of the polarization state of the light in the liquid crystal layer 300 (in other words, the change of the polarization state of the light from the polarization state ③ to the polarization state ④ is in the same direction as the change of the polarization state of the light from the polarization state ② to the polarization state ③, and these two stages of change of the polarization state are superimposed on each other for at least one full circle on the Poincare Sphere around the center thereof, so that the polarization state ④ is essentially reset to the polarization state ②). Specifically, either a sum of an optical path difference of the first compensation film layer 400 and an optical path difference of the liquid crystal layer 300 is 1 times of a wavelength of the light incident onto the display panel from the backlight source such that the two stages of change of the polarization state are superposed on each other exactly to complete a full cycle so as to reset to the polarization state ②, or the sum of the optical path difference of the first compensation film layer 400 and the optical path difference of the liquid crystal layer 300 is an integral multiple, which is equal to or more than 2 times, of the wavelength of the light incident onto the display panel from the backlight source such that the two stages of change of the polarization state are superposed on each other exactly for a whole cycle, and then the polarization state of the light further rotates one or more full cycles on the Poincare Sphere around the center thereof in the same direction as the direction of the variation tendency of the polarization state of the light in the liquid crystal layer 300 so as to reset to the polarization state ②; or A reverse compensation (or referred to as a reset by cancellation), specifically comprising: the polarization state of the light changes from "a polarization state ② of the light after passing through the glass of the second substrate 200 which abuts against the lower polarizer but prior to entering the liquid crystal layer 300" to "a polarization state ④ of the light after passing through the first compensation layer 400 but prior to entering the glass of the upper first substrate 100 which abuts against the upper polarizer", by applying an optical rotation effect onto the light, in a direction opposite to the direction of the variation tendency of the polarization state of the light on the Poincare Sphere around the center of the Poincare Sphere (that is to say, the first compensation film layer 400 is set to have its optical axis direction (i.e., the direction of is optical axis) perpendicular to the direction of the initial optical axis of the liquid crystal molecules in the liquid crystal layer 300), and the change of the polarization state of the light from the polarization state ③ to the polarization state ④ is specifically set forth as follows: the change of the polarization state of the light in the first compensation film layer 400 and the change of the polarization state of the light in the liquid crystal layer 300 completely or at least partially cancel each other such that, the change of the polarization state of the light during a period from the polarization state ②, through a polarization state ③ of the light after being modulated by the optical rotation effect of the liquid crystal layer 300, and then to the polarization state ④ comprises: the change of the polarization state of the light from the polarization state ② to the polarization state ② is essentially a rotation of the polarization state of the light on the Poincare Sphere around the center thereof in the liquid crystal layer 300, and the subsequent change of the polarization state of the light from the polarization state ③ to the polarization state ④ (said subsequent change functions to implement a reverse effect on the polarization state of the light) is essentially a rotation of the polarization state of the light on the Poincare Sphere around the center thereof in the direction opposite to the direction of the variation tendency of the polarization state of the light in the liquid crystal layer 300, and respective paths of above two rotations of the polarization state of the light on the Poincare Sphere around the center thereof in these two stages of change of the polarization state are opposite to each other such that these two stages of change of the polarization state at least partially cancel each other so as to reset the polarization state of the light to the polarization state ②. Specifically, either the optical path difference of the first compensation film layer 400 and the optical path difference of the liquid crystal layer 300 have one and the same absolute value (i.e., a difference between their respective absolute values is zero) such that respective processes of these two stages of change of the polarization state exactly cancel each other out so as to directly reset to the polarization state ②, or the difference between the optical path difference of the first compensation film layer 400 and the optical path difference of the liquid crystal layer 300 is an integral multiple, which is equal to or more than 1 times, of the wavelength of the light incident onto the display panel from the backlight source such that after the cancellation of respective processes of these two stages of change of the polarization state, the polarization state of the light further rotates at least one full cycle on the Poincare Sphere around the center thereof in the direction opposite to the direction of the variation tendency of the polarization state of the light in the liquid crystal layer 300 so as to indirectly reset to the polarization state ②.

According to embodiments of the disclosure, in the display panel according to the embodiment of the disclosure, for example, in order to realize the positive compensation (i.e. "reset by superposition") of light polarization state, the first compensation film layer 400 may be set to have its optical axis direction (i.e., the direction of is optical axis) parallel to the direction of the initial optical axis of the liquid crystal molecules in the liquid crystal layer 300; and the sum of the optical path difference of the first compensation film layer 400 and the optical path difference of the liquid crystal layer 300 is an integral multiple of the wavelength of the incident light.

Specifically, in the display panel according to the embodiment of the disclosure, in a condition that the sum of the optical path difference of the first compensation film layer 400 and the optical path difference of the liquid crystal layer 300 is an integral multiple of the wavelength of the incident light and the optical axis direction of the first compensation film layer 400 is parallel to the direction of the initial optical axis of the liquid crystal molecules in the liquid crystal layer 300, when an optical anisotropy is induced in each of the first substrate and the second substrate in a condition that the first substrate 100 and the second substrate 200 are subjected to respective non-uniform external forces respectively, a change occurs in the polarization state of the light passing therethrough, then, the first compensation film layer 400 is capable of compensating for the phase delay of the polarized light passing through the liquid crystal layer 300, such that a total phase delay of the light after passing sequentially through the first substrate 100, the second substrate 200, the liquid crystal layer 300 and the first compensation film layer 400 is approximate to or equal to the integral multiple of the wavelength of the incident light and the light may further return to a certain extent towards its original polarization state. As such, most of the light fails to exit the horizontal electric field type display panel in a condition of the dark state, thus improving the problem of light leakage in the dark state.

Specifically, in the display panel according to the embodiment of the disclosure, the sum of the optical path difference of the first compensation film layer 400 and the optical path difference of the liquid crystal layer 300 may be an integral multiple of the wavelength of the incident light, so as to guarantee that, the optical path difference of the polarized light generated when passing through the liquid crystal layer 300 may return to a vicinity of a previous polarization state after a compensation for the optical path difference by the first compensation film layer 400. The wavelength of incident light may fall within a wavelength range of visible light, and the wavelength of incident light may also be a wavelength of monochromatic light commonly used in a display panel, for example, falling within a wavelength range of red light, a wavelength range of green light, a wavelength range of blue light, or the like; and the wavelength of incident light may also be a standard wavelength, e.g., 550 nm, and specific value of the wavelength of the incident light will not be limited here.

Moreover, the sum of the optical path difference of the first compensation layer 400 and the optical path difference of the liquid crystal layer 300 may not be strictly in accordance with integral times of the wavelength of the incident light, and there may exist a certain tolerance range, for example, the tolerance range is within ±20%, all falling within a scope of protection of the present disclosure. Furthermore, the optical axis direction of the first compensation film layer 400 and the direction of the initial optical axis of the liquid crystal molecules in the liquid crystal layer 300 may also be parallel to each other, for example, with a certain tolerance range of ±11°, all falling within the scope of protection of the present disclosure.

According to the embodiment of the present disclosure, in the display panel according to the embodiment of the disclosure, the sum of the optical path difference of the first compensation film layer 400 and the optical path difference of the liquid crystal layer 300 is an integral multiple of the wavelength of the incident light, wherein the integral multiple may for example be 1, that is, the optical path difference of the first compensation film layer 400 may be added to the optical path difference of the liquid crystal layer 300 to obtain a sum equal to 1, and for example the optical path difference of the first compensation film layer 400 may be approximate or equal to the optical path difference of the liquid crystal layer 300. As such, a thickness of the first compensation film layer 400 may be reduced as much as possible, so as to facilitate fabricating the first compensation film layer 400 and to facilitate an overall thinning of the module.

Figure 5A:
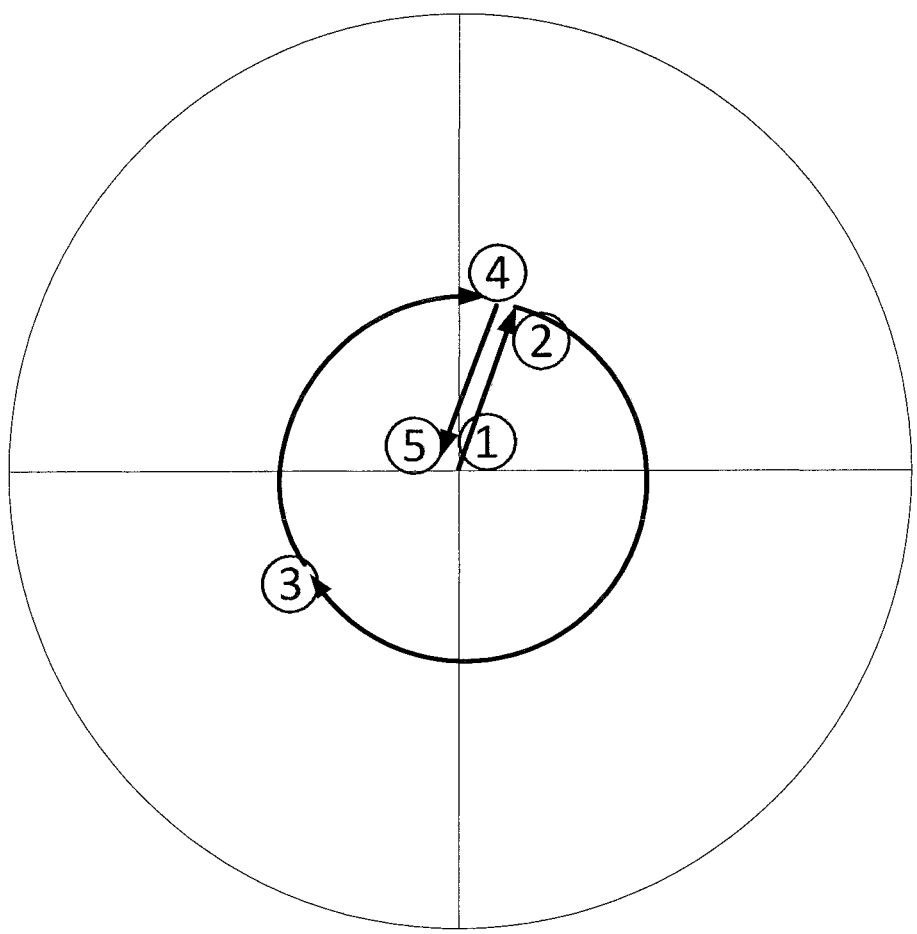
FIG. 5a and FIG. 5b are schematic views of polarization states of light passing through various layers of the liquid crystal display panel according to embodiments of the present disclosure, respectively, illustrated on a Poincare Sphere.

For example, the optical path difference of the first compensation film layer 400 is λ–340 nm, and λ is the wavelength of the incident light. The optical path difference of liquid crystal layer 300 is 340 nm. In such a condition, as illustrated in FIG. 5*a*, the optical axis direction of the first compensation film layer 400 is parallel to the direction of the initial optical axis of the liquid crystal molecules in the liquid crystal layer 300 (i.e., the optical rotation effect is applied in the same direction as the direction of the variation tendency of the polarization state of the light on the Poincare Sphere around the center of the Poincare Sphere), and various stages/processes of the polarization states of the light emitted by the backlight source, when passing through the liquid crystal display panel in the dark state, on the Poincare Sphere are set forth respectively as follows: after passing through the lower polarizer, the light becomes a linearly polarized light, which is located at point ①; after passing through the second substrate 200 which produces a non-uniform stress therein, a change occurs in the polarization state of the light and more specifically, the light transits from the linearly polarized light to an elliptically polarized light which is located at position ②; an elliptically polarized light whose optical axis is not parallel to the optical axis of the liquid crystal, will be modulated by the liquid crystal so as to induce a change in the polarization state thereof such that the polarization state is at position ③; after the light passing through the first compensation layer 400 whose optical path difference is added to the optical path difference of the liquid crystal layer 300 to obtain the sum of optical path difference of λ, namely, the optical path difference of the first compensation layer 400 is used to compensate for the previously generated additional optical path difference, and the compensated polarization state is located at ④, as illustrated in FIG. 5*a*, such that the "polarization state ④ of the light after passing through the first compensation layer 400 but prior to entering the glass of the upper first substrate 100 which abuts against the upper polarizer" is considered to be opposite in direction and substantially equal in size as compared with the "polarization state ② of the light after passing through the glass of the second substrate 200 which abuts against the lower polarizer but prior to entering the liquid crystal layer 300" (in other words, since the optical axis direction of the first compensation film layer 400 is parallel to the direction of the initial optical axis of the liquid crystal molecules in the liquid crystal layer 300, then in a condition that the sum of the optical path difference of the first compensation film layer 400 and the optical path difference of the liquid crystal layer 300 is one time of the wavelength of the incident light, if the liquid crystal layer 300 and the first compensation film layer 400 are defined to cooperate with each other to function collectively as an intermediate layer between the second substrate 200 and the first substrate 100, an overall effect of the intermediate layer being applied on the light incident thereon may in essence be considered to be: In the process of the polarization state transiting from the polarization state ②, through the polarization state ③ after being modulated by the optical rotation effect within the liquid crystal layer, to the polarization state ④, the polarization state of the light rotates one full circle on the Poincare Sphere around the center thereof in one and the same direction, which substantially keeps the polarization state of the light emitted from the intermediate layer unchanged as compared with the polarization state of the light incident on the intermediate layer); therefore, after passing through the first substrate 100 which generates the non-uniform stress therein, the polarization state moves to position ⑤ which coincides with position ①, then an influence of optical anisotropy incurred by the non-uniform external force on each of the first substrate 100 and the second substrate 200 will be canceled out completely, and the problem of light leakage in the dark state will not occur.

Figure 5B:
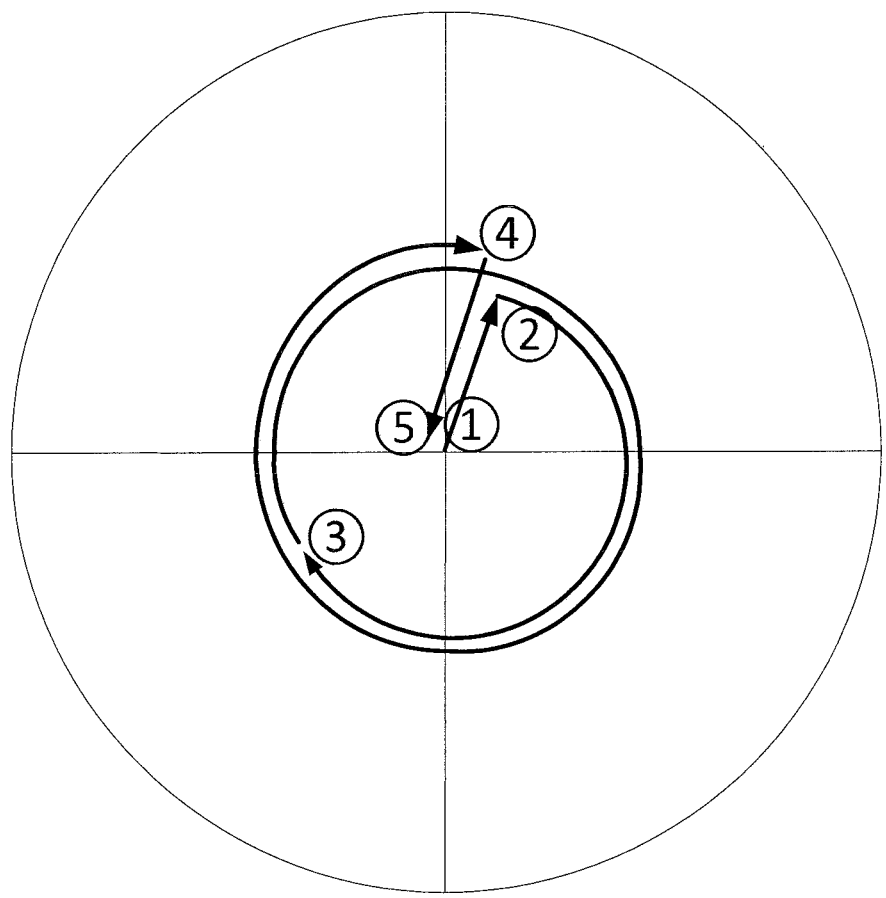

According to the embodiment of the present disclosure, in the display panel according to the embodiment of the disclosure, the sum of the optical path difference of the first compensation film layer 400 and the optical path difference of the liquid crystal layer 300 is an integral multiple of the wavelength of the incident light, the optical path difference of the first compensation film layer 400 may for example be 2*λ–340 nm, and the optical path difference of liquid crystal layer 300 may for example be 340 nm. In such a condition, as illustrated in FIG. 5*b*, the optical axis direction of the first compensation film layer 400 is parallel to the direction of the initial optical axis of the liquid crystal molecules in the liquid crystal layer 300 (i.e., the optical rotation effect is applied in the same direction as the direction of the variation tendency of the polarization state of the light on the Poincare Sphere around the center of the Poincare Sphere), and various stages/processes of the polarization states of the light emitted by the backlight source, when passing through the liquid crystal display panel in the dark state, on the Poincare Sphere are set forth respectively as follows: after passing through the lower polarizer, the light becomes a linearly polarized light, which is located at point ①; after passing through the second substrate 200 which produces a non-uniform stress therein, a change occurs in the polarization state of the light and more specifically, the light transits from the linearly polarized light to an elliptically polarized light which is located at position ②; an elliptically polarized light whose optical axis is not parallel to the optical axis of the liquid crystal, will be modulated by the liquid crystal so as to induce a change in the polarization state thereof such that the polarization state is at position ③; after the light passing through the first compensation layer 400 whose optical path difference is added to the optical path difference of the liquid crystal layer 300 to obtain the sum of optical path difference of 2*λ, namely, the optical path difference of the first compensation layer 400 is used, not only to compensate for the previously generated additional optical path difference, but also to realize that the polarization state of the light rotates one more full circle (one full circle represents λ) on the Poincare Sphere around the center thereof after the compensation of the previously generated additional optical path difference, and the compensated polarization state is located at ④, as illustrated in FIG. 5b, such that the "polarization state ④ of the light after passing through the first compensation layer 400 but prior to entering the glass of the upper first substrate 100 which abuts against the upper polarizer" is considered to be opposite in direction and substantially equal in size as compared with the "polarization state ② of the light after passing through the glass of the second substrate 200 which abuts against the lower polarizer but prior to entering the liquid crystal layer 300" (in other words, since the optical axis direction of the first compensation film layer 400 is parallel to the direction of the initial optical axis of the liquid crystal molecules in the liquid crystal layer 300, then in a condition that the sum of the optical path difference of the first compensation film layer 400 and the optical path difference of the liquid crystal layer 300 is an integral multiple, which is equal to or more than 2 times, of the wavelength of the incident light, if the liquid crystal layer 300 and the first compensation film layer 400 are defined to cooperate with each other to function collectively as an intermediate layer between the second substrate 200 and the first substrate 100, an overall effect of the intermediate layer being applied on the light incident thereon may in essence be considered to be: In the process of the polarization state transiting from the polarization state ②, through the polarization state ③ after being modulated by the optical rotation effect within the liquid crystal layer, to the polarization state ④, the polarization state of the light rotates at least two full circles on the Poincare Sphere around the center thereof in one and the same direction (as illustrated in FIG. 5b, the intermediate layer, which is defined collectively by both the liquid crystal layer and the first compensation film layer, rotates the polarization state of the light on the Poincare Sphere exactly two cycles around the center of the Poincare Sphere), which substantially keeps the polarization state of the light emitted from the intermediate layer unchanged as compared with the polarization state of the light incident on the intermediate layer); therefore, after passing through the first substrate 100 which generates the non-uniform stress therein, the polarization state moves to position ⑤ which coincides with position ①, then an influence of optical anisotropy incurred by the non-uniform external force on each of the first substrate 100 and the second substrate 200 will be canceled out completely, and the problem of light leakage in the dark state will not occur.

Alternatively, according to embodiments of the disclosure, in the display panel according to the embodiment of the disclosure, for example, in order to realize the reverse compensation (i.e. "reset by cancellation") of light polarization state, the first compensation film layer 400 may be set to have its optical axis direction (i.e., the direction of is optical axis) perpendicular to the direction of the initial optical axis of the liquid crystal molecules in the liquid crystal layer 300; and the difference between an phase difference of the first compensation film layer 400 and an phase difference of the liquid crystal layer 300 is an integral multiple of the wavelength of the incident light.

Specifically, in the display panel according to the embodiment of the disclosure, in a condition that the difference between the phase difference of the first compensation film layer 400 and the phase difference of the liquid crystal layer 300 is an integral multiple of the wavelength of the incident light and the optical axis direction of the first compensation film layer 400 is perpendicular to the direction of the initial optical axis of the liquid crystal molecules in the liquid crystal layer 300, when an optical anisotropy is induced in each of the first substrate and the second substrate in a condition that the first substrate 100 and the second substrate 200 are subjected to respective non-uniform external forces respectively, a change occurs in the polarization state of the light passing therethrough, then, the first compensation film layer 400 is capable of compensating for the phase delay of the polarized light passing through the liquid crystal layer 300, such that a total phase delay of the light after passing sequentially through the first substrate 100, the second substrate 200, the liquid crystal layer 300 and the first compensation film layer 400 is approximate to or equal to the integral multiple of the wavelength of the incident light and the light may further return to a certain extent towards its original polarization state. As such, most of the light fails to exit the horizontal electric field type display panel in a condition of the dark state, thus improving the problem of light leakage in the dark state.

Specifically, in the display panel according to the embodiment of the disclosure, the difference between the phase difference of the first compensation film layer 400 and the phase difference of the liquid crystal layer 300 may be an integral multiple of the wavelength of the incident light, so as to guarantee that, the phase difference of the polarized light generated when passing through the liquid crystal layer 300 may return to a vicinity of a previous polarization state after a cancellation of the phase difference and a compensation for the phase difference by the first compensation film layer 400. The wavelength of incident light may fall within a wavelength range of visible light, and the wavelength of incident light may also be a wavelength of monochromatic light commonly used in a display panel, for example, falling within a wavelength range of red light, a wavelength range of green light, a wavelength range of blue light, or the like; and the wavelength of incident light may also be a standard wavelength, e.g., 550 nm, and specific value of the wavelength of the incident light will not be limited here.

Moreover, the difference between the phase difference of the first compensation film layer 400 and the phase difference of the liquid crystal layer 300 may not be strictly in accordance with integral times of the wavelength of the incident light, and there may exist a certain tolerance range, for example, the tolerance range is within ±20%, all falling within a scope of protection of the present disclosure. Furthermore, the optical axis direction of the first compensation film layer 400 and the direction of the initial optical axis of the liquid crystal molecules in the liquid crystal layer 300 may also be perpendicular to each other, for example, with a certain tolerance range of ±11°, all falling within the scope of protection of the present disclosure.

According to the embodiment of the present disclosure, in the display panel according to the embodiment of the disclosure, the difference between the phase difference of the first compensation film layer 400 and the phase difference of the liquid crystal layer 300 is an integral multiple of the wavelength of the incident light, wherein the integral multiple may for example be zero, that is, the phase difference of the first compensation film layer 400 may be equal to the phase difference of the liquid crystal layer 300. As such, a thickness of the first compensation film layer 400 may be reduced as much as possible, so as to facilitate fabricating the first compensation film layer 400 and to facilitate an overall thinning of the module.

Figure 6A:
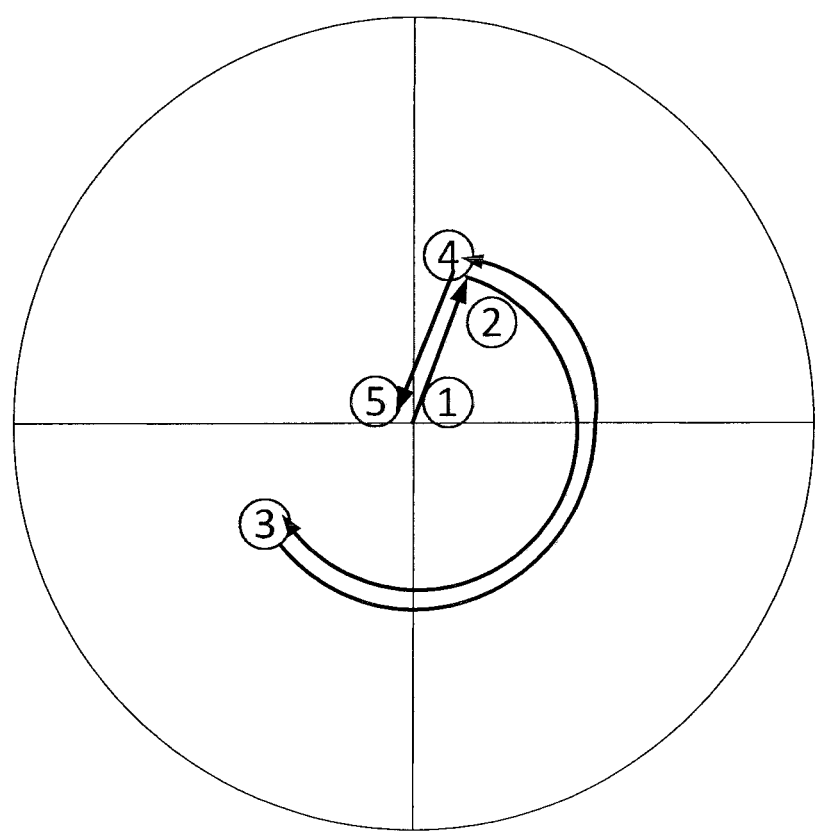
FIG. 6a and FIG. 6b are schematic views of polarization states of light passing through various layers of the liquid crystal display panel according to some other embodiments of the present disclosure, respectively, illustrated on a Poincare Sphere.

For example, each of the phase difference of the first compensation film layer 400 and the phase difference of the liquid crystal layer 300 is 350 nm. In such a condition, as illustrated in FIG. 6a, the optical axis direction of the first compensation film layer 400 is perpendicular to the direction of the initial optical axis of the liquid crystal molecules in the liquid crystal layer 300 (i.e., the optical rotation effect is applied in the direction opposite to the direction of the variation tendency of the polarization state of the light on the Poincare Sphere around the center of the Poincare Sphere), and various stages/processes of the polarization states of the light emitted by the backlight source, when passing through the liquid crystal display panel in the dark state, on the Poincare Sphere are set forth respectively as follows: after passing through the lower polarizer, the light becomes a linearly polarized light, which is located at point ①; after passing through the second substrate 200 which produces a non-uniform stress therein, a change occurs in the polarization state of the light and more specifically, the light transits from the linearly polarized light to an elliptically polarized light which is located at position ②; an elliptically polarized light whose optical axis is not parallel to the optical axis of the liquid crystal, will be modulated by the liquid crystal so as to induce a change in the polarization state thereof such that the polarization state is at position ③; after the light passing through the first compensation layer 400 whose phase difference coincides with that of the liquid crystal layer 300, namely, the phase difference of the first compensation layer 400 is used to compensate for the previously generated additional phase difference, and the compensated polarization state is located at ④, as illustrated in FIG. 6a, such that the "polarization state ④ of the light after passing through the first compensation layer 400 but prior to entering the glass of the upper first substrate 100 which abuts against the upper polarizer" is considered to be opposite in direction and substantially equal in size as compared with the "polarization state ② of the light after passing through the glass of the second substrate 200 which abuts against the lower polarizer but prior to entering the liquid crystal layer 300" (in other words, since the optical axis direction of the first compensation film layer 400 is perpendicular to the direction of the initial optical axis of the liquid crystal molecules in the liquid crystal layer 300, then in a condition that the difference between the optical path difference of the first compensation film layer 400 and the optical path difference of the liquid crystal layer 300 is zero, i.e. the absolute values of respective the optical path differences of the two layers are equal to each other, if the liquid crystal layer 300 and the first compensation film layer 400 are defined to cooperate with each other to function collectively as an intermediate layer between the second substrate 200 and the first substrate 100, an overall effect of the intermediate layer being applied on the light incident thereon may in essence be considered to be: In the process of the polarization state transiting from the polarization state ②, through the polarization state ③ after being modulated by the optical rotation effect within the liquid crystal layer, to the polarization state ④, respective processes of these two stages of change of the polarization state exactly cancel each other out so as to directly reset to the polarization state ②, the changes of optical polarization state from the polarization state ③ to the polarization state ④ is a reverse process which reversely/oppositely overlaps the changes of polarization state of light from the polarization state ② to the polarization state ③, which substantially keeps the polarization state of the light emitted from the intermediate layer unchanged as compared with the polarization state of the light incident on the intermediate layer); therefore, after passing through the first substrate 100 which generates the non-uniform stress therein, the polarization state moves to position ⑤ which coincides with position ①, then an influence of optical anisotropy incurred by the non-uniform external force on each of the first substrate 100 and the second substrate 200 will be canceled out completely, and the problem of light leakage in the dark state will not occur.

Figure 6B:
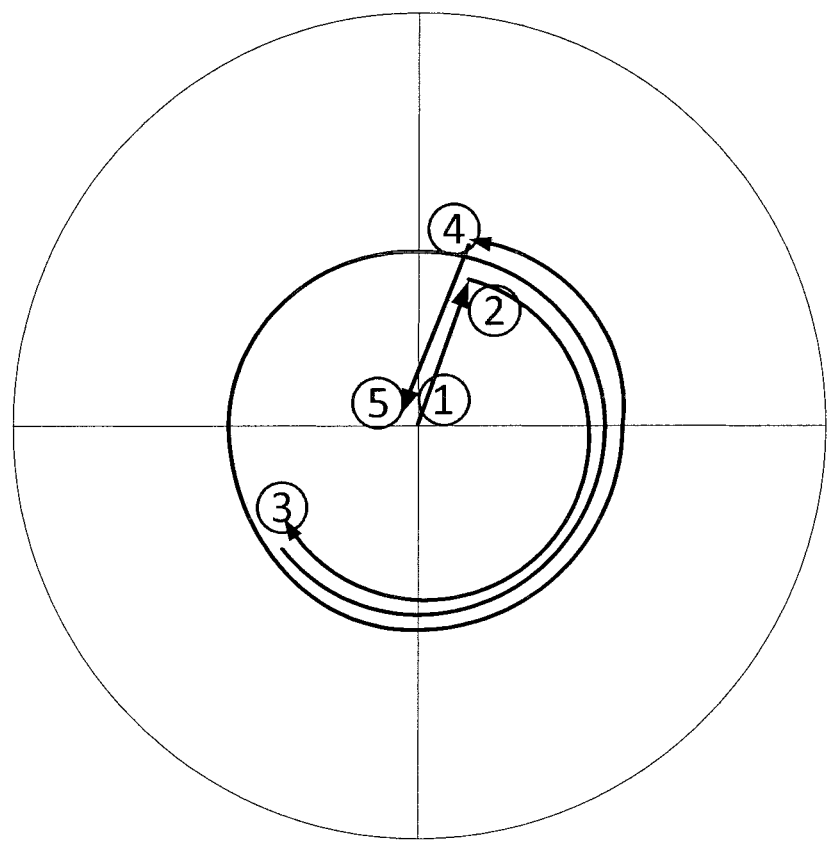

According to the embodiment of the present disclosure, in the display panel according to the embodiment of the disclosure, the difference between the phase difference of the first compensation film layer 400 and the phase difference of the liquid crystal layer 300 is an integral multiple of the wavelength of the incident light, for example, in a condition that the integral multiple is one time, the phase difference of the liquid crystal layer 300 may be 320 nm, the phase difference of the first compensation film layer 400 may be 320 nm+λ, and λ is the wavelength of the incident light. In such a condition, as illustrated in FIG. 6b, the optical axis direction of the first compensation film layer 400 is perpendicular to the direction of the initial optical axis of the liquid crystal molecules in the liquid crystal layer 300 (i.e., the optical rotation effect is applied in the direction opposite to the direction of the variation tendency of the polarization state of the light on the Poincare Sphere around the center of the Poincare Sphere), and various stages/processes of the polarization states of the light emitted by the backlight source, when passing through the liquid crystal display panel in the dark state, on the Poincare Sphere are set forth respectively as follows: after passing through the lower polarizer, the light becomes a linearly polarized light, which is located at point ①; after passing through the second substrate 200 which produces a non-uniform stress therein, a change occurs in the polarization state of the light and more specifically, the light transits from the linearly polarized light to an elliptically polarized light which is located at position ②; an elliptically polarized light whose optical axis is not parallel to the optical axis of the liquid crystal, will be modulated by the liquid crystal so as to induce a change in the polarization state thereof such that the polarization state is at position ③; after the light passing through the first compensation layer 400 whose phase difference is different from that of the liquid crystal layer 300 with a specific difference of λ, namely, the phase difference of the first compensation layer 400 is used to compensate for the previously generated additional phase difference and then to realize that the polarization state of the light rotates one cycle (one circle represents λ) on the Poincare Sphere around the center thereof, and the compensated polarization state is located at ④, as illustrated in FIG. 6b, such that the "polarization state ④ of the light after passing through the first compensation layer 400 but prior to entering the glass of the upper first substrate 100 which abuts against the upper polarizer" is considered to be opposite in direction and substantially equal in size as compared with the "polarization state ② of the light after passing through the glass of the second substrate 200 which abuts against the lower polarizer but prior to entering the liquid crystal layer 300" (in other words, since the optical axis direction of the first compensation film layer 400 is perpendicular to the direction of the initial optical axis of the liquid crystal molecules in the liquid crystal layer 300, then in a condition that the difference between the optical path difference of first compensation film layer 400 and the optical path difference of the liquid crystal layer 300 is an integral multiple, which is equal to or more than 1, of the wavelength of the incident light, if the liquid crystal layer 300 and the first compensation film layer 400 are defined to cooperate with each other to function collectively as an intermediate layer between the second substrate 200 and the first substrate 100, an overall effect of the intermediate layer being applied on the light incident thereon may in essence be considered to be: In the process of the polarization state transiting from the polarization state $\hat{2}$, through the polarization state ③ after being modulated by the optical rotation effect within the liquid crystal layer, to the polarization state ④, respective processes of these two stages of change of the polarization state cancel each other and then the polarization state the polarization state of the light further rotates at least one full cycle in the direction opposite to the direction of the variation tendency of the polarization state of the light within the liquid crystal layer 300 on the Poincare Sphere around the center of the Poincare Sphere (FIG. 6B further illustrates that the polarization state of the light additionally rotates one full circle on the Poincare Sphere around the center thereof reversely, i.e., in the opposite direction) so as to indirectly reset to the polarization state $\hat{2}$, which substantially keeps the polarization state of the light emitted from the intermediate layer unchanged as compared with the polarization state of the light incident on the intermediate layer); therefore, after passing through the first substrate 100 which generates the non-uniform stress therein, the polarization state moves to position ⑤ which coincides with position ①, then an influence of optical anisotropy incurred by the non-uniform external force on each of the first substrate 100 and the second substrate 200 will be canceled out completely, and the problem of light leakage in the dark state will not occur.

It should be noted that, a relationship between the optical path difference and the phase difference referred to in the above display panel according to the embodiment of the present disclosure is: optical path difference/phase difference=λ/2π.

According to the embodiment of the present disclosure, in the display panel according to the embodiment of the disclosure, the first compensation film layer has a thickness which is generally controlled within a range of 1 μm to 5 μm.

According to the embodiment of the present disclosure, in the display panel according to the embodiment of the disclosure, the first compensation film layer is a +A compensation film layer, which is also referred to as +A plate and meets a requirement of nx1>ny1=nz1, wherein nx1 is a refractive index in a direction of an x-axis in a plane of the +A compensation film layer, ny1 is a refractive index in a direction of the y-axis direction perpendicular to the x-axis in the plane of the +A compensation film layer, and nz1 is a refractive index in a direction of the thickness in the plane of the +A compensation film layer.

Specifically, an in-plane phase delay of the +A compensation film layer '$R_{+A}$' is expressed as $R_{+A}=(nx-ny)*d1$, wherein d1 is the thickness of the +A compensation film layer. An in-plane phase delay of the liquid crystal layer 300 '$R_{LC}$' is expressed as $R_{LC}=(n_e-n_0)*d2$, wherein d2 is the thickness of the liquid crystal layer 300, $n_e$ is a refractive index of extraordinary light, no is a refractive index of ordinary light. By adjusting relevant parameters of the +A compensation film layer such that a requirement of $R_{+A}-R_{LC}=m*\lambda$, (m=0, ±1, ±2 . . . ) may be satisfied, i.e., a requirement of $(nx1-ny1)*d1=(n_e-n_0)*d2+m*\lambda$ may be met. As such, when the optical axis direction of the +A compensation film layer is parallel to a direction of respective long axes direction of the liquid crystal molecule in the initial state, therefore, the +A compensation film layer may compensate for the in-plane phase delay caused by the light passing through the liquid crystal layer 300. The optical axis direction of the +A compensation film layer is a direction in which respective refraction direction of the o-light and the e-light produced by the light passing through the +A compensation film layer coincides with each other.

According to the embodiment of the present disclosure, in the display panel according to the embodiment of the disclosure, as illustrated in FIG. 3, the first compensation film layer 400 may be located on a side of the second substrate 200 facing towards the liquid crystal layer 300; alternatively, as illustrated in FIG. 4, the first compensation film layer 400 may also be located on a side of the first substrate 100 facing towards the liquid crystal layer 300, without be restricted in this connection herein.

According to the embodiment of the present disclosure, in the display panel according to the embodiment of the disclosure, as shown in FIG. 4, it may also comprise: a color film layer 110 located on the side of the first substrate 100 facing towards the liquid crystal layer 300, and a spacer layer 130 located on a side of the color film layer 110 facing towards the liquid crystal layer 300; and the first compensation film layer may be multiplexed as a planarization layer between the color film layer 110 and the spacer layer 130.

Specifically, in a condition that the first compensation film layer 400 is located on the side of the first substrate 100 facing towards the liquid crystal layer 300, the first compensation film layer 400 is multiplexed as the planarization layer 120, which may simplify the complexity of the process flow and help to save the production cost.

According to the embodiment of the present disclosure, in the display panel according to the embodiment of the disclosure, in order to ensure that the first compensation film layer 400 which is multiplexed as the planarization layer 120 may function to have a planarization effect, that is, to fill unevenness of the upper surface of the color film layer 110, the thickness of the first compensation film layer 400 is required to fall within a range of 0.8 μm~2.5 μm, so as to ensure that it may function to have a planarization effect. Moreover, a viscosity of the first compensation film layer 400 prior to its curing is required to fall within a range of 1.0 mPa·s~15 mPa·s, so as to ensure a fluidity of the first compensation film layer 400, which may be filled into the uneven gaps so as to function to have a planarization effect.

Specifically, since the light absorption axes of the upper polarizer and the lower polarizer of the display panel are perpendicular to each other, when viewing the display panel from the axial direction (the axial direction refers to the direction perpendicular to the display screen), respective light absorption axes of the upper polarizer 22 and the lower polarizer are perpendicular to each other; however, when viewing the display panel in a non-axial direction (the non-axial direction refers to a direction not perpendicular to the display screen), i.e., in an off-axis state with relatively large viewing angle, due to an increase in viewing angle, the light absorption axes of the polarizers which would have been perpendicular to each other may shift, that is, the optical absorption axes of the upper polarizer and the lower polarizer are not perpendicular to each other, which will lead to a relatively small non-axial viewing angle range, light leakage and the like, ultimately affecting the viewing effect.

In order to improve the light leakage problem of the off-axis state with relatively large viewing angle, according to the embodiment of the disclosure, in the display panel according to the embodiment of the disclosure, as illustrated in FIG. 7 to FIG. 13, it may further comprises: a second compensation film layer 500, which is located on a light-emergent side of the liquid crystal layer 300 and the first compensation film layer 400, and is configured to compensate for a phase delay of a non-axial light. If the second substrate 200 functions as a light-incident side and the first substrate 100 functions as the light-emergent side, then, the second compensation film layer 500 is closer to the first substrate 100 than the liquid crystal layer 300 and the first compensation film layer 400, that is, the light will pass through the liquid crystal layer 300 and the first compensation film layer 400 above all, and then pass through the second compensation film layer 500. It should be noticed that since the axial direction refers to the direction perpendicular to the display screen and the non-axial direction refers to the direction not perpendicular to the display screen, then, the non-axial light refers to the light incident along the direction not perpendicular to the display screen.

Figure 14:
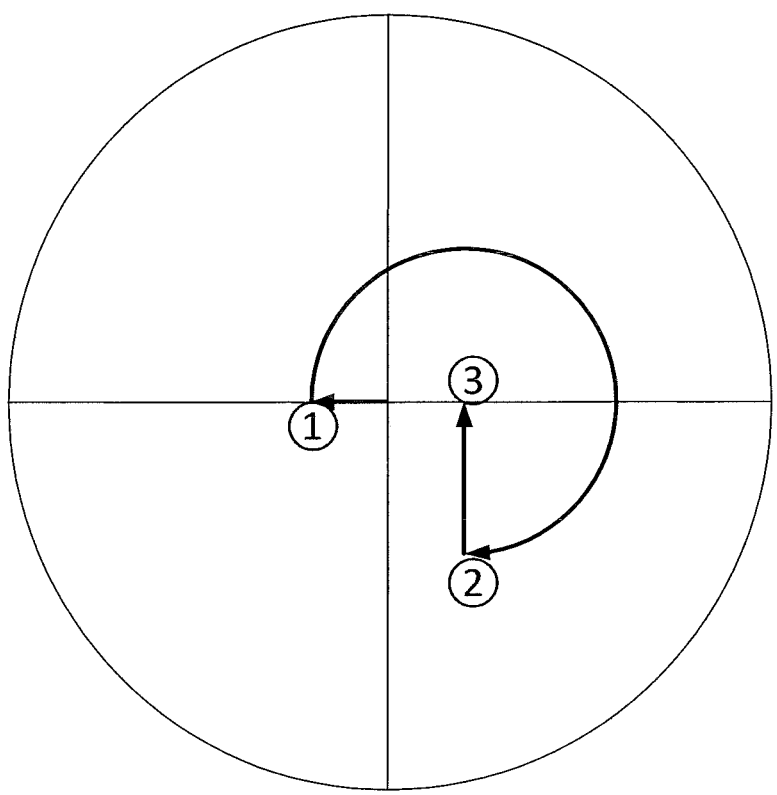
FIG. 14 is a schematic view of polarization states of light passing through various layers of the liquid crystal display panel according to another embodiment of the present disclosure, respectively, illustrated on a Poincare Sphere.

Specifically, as illustrated in FIG. 14, in the off-axis state with relatively large viewing angle, various stages/processes of the polarization states of the light emitted by the backlight source, when passing through the liquid crystal display panel in the dark state, on the Poincare Sphere are set forth respectively as follows: when the light passes through the lower polarizer, the second substrate 200 and the liquid crystal layer 300, the polarization state thereof may be changed to a certain extent, which is now located at point ①; after passing through the first compensation film layer 400, the polarization state thereof may be changed to a relatively large extent, which is then located at point ②; next, the polarization state is improved by the second compensation film layer 500, after the light passes through the second compensation film layer 500, the polarization state moves to point ③; the direction of the light absorption axis of point ③ and the direction of the light absorption axis of the upper polarizer is almost orthogonal to each other, then, then emergent light may be completely absorbed by the upper polarizer, and the problem of light leakage in the dark state will not occur in the off-axis state with relatively large viewing angle. Therefore, the second compensation film layer 500 cooperates with the first compensation film layer 400, so as to implement a compensation for the polarization state of non-axial emergent light and in turn to improve the light leakage problem in the dark state at the non-axial viewing angle.

According to the embodiment of the present disclosure, in the display panel according to the embodiment of the disclosure, the second compensation film layer 500 may be a +C compensation film layer, which is also known as a +C plate and meets a requirement of $nz2>ny2=nx2$, wherein $nx2$ is a refractive index in a direction of an x-axis in a plane of this optical compensation film layer, $ny2$ is a refractive index in a direction of the y-axis direction perpendicular to the x-axis in the plane of this optical compensation film layer, and $nz2$ is a refractive index in a direction of the thickness in the plane of this optical compensation film layer; or, the second compensation film layer 500 may be a -C compensation film layer, which is also known as a -C plate and meets a requirement of $nz3<ny3=nx3$, wherein $nx3$ is a refractive index in a direction of an x-axis in a plane of this optical compensation film layer, $ny3$ is a refractive index in a direction of the y-axis direction perpendicular to the x-axis in the plane of this optical compensation film layer, and $nz3$ is a refractive index in a direction of the thickness in the plane of this optical compensation film layer.

Specifically, an thickness phase delay of +C compensation film layer is $Rth=[(nx2+ny2)/2-nz2] \times d3$, where $d3$ is the thickness of +C compensation film layer. Since the +C compensation film layer meets the requirement of $nz2>ny2=nx2$, then its in-plane phase delay is $R+C=0$, that is to say, the in-plane phase delay of the +C compensation film layer is zero, and there is a phase delay in the thickness direction. The thickness phase delay of the -C compensation film layer is $Rth=[(nx3+ny3)/2-nz3] \times d4$, where $d4$ is the thickness of -C compensation film. Since the -C compensation film layer meets the requirement of $nz3<ny3=nx3$, its in-plane phase delay is $R+C=0$, that is to say, the in-plane phase delay of the -C compensation film layer is zero, and there is a phase delay in the thickness direction.

According to the embodiment of the present disclosure, in the display panel according to the embodiment of the disclosure, the thickness of the second compensation film layer 500 is generally controlled within a range of 0.5 μm to 5 μm.

Specifically, since the second compensation film layer 500 has no in-plane phase delay, there is no requirement for its optical axis direction, which may be orientated in any direction. According to the embodiment of the present disclosure, in the display panel according to the embodiment of the disclosure, the second compensation film layer 500 has its phase delay amount 'Rth' in the thickness direction thereof, which may be selected from a range of 92 nm~300 nm.

Figure 7:
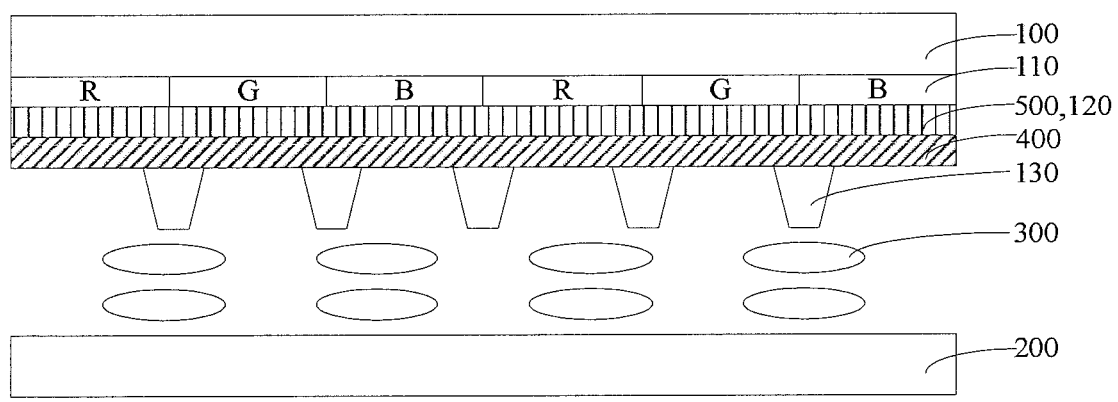
FIG. 7 is a schematic structural view of a display panel having a second compensation film layer, according to an embodiment of the disclosure.
Figure 8:
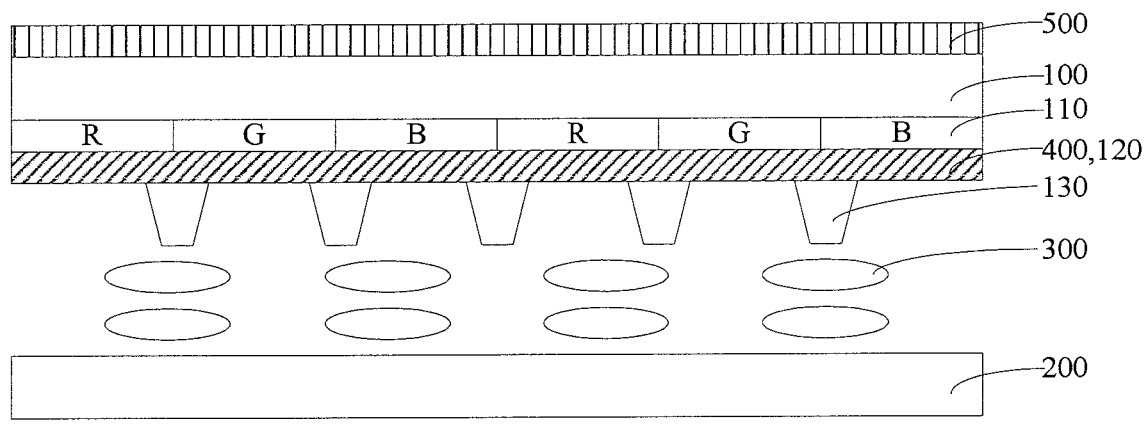
FIG. 8 is a schematic structural view of a display panel having a second compensation film layer, according to another embodiment of the disclosure.

According to the embodiment of the present disclosure, in the display panel according to the embodiment of the disclosure, as illustrated in FIG. 7 and FIG. 8, the first compensation film layer 400 and the second compensation film layer 500 are located on one and the same side of the liquid crystal layer 300, and the second compensation film layer 500 is located on a side of the first compensation film layer 400 facing away from the liquid crystal layer 300.

Specifically, both the first compensation film layer 400 and the second compensation film layer 500 are provided on the side of the first substrate 100 facing towards the liquid crystal layer 300, i.e., both the first compensation film layer 400 and the second compensation film layer 500 are formed on the first substrate 100, facilitating fabrication processes.

According to the embodiment of the present disclosure, in the display panel according to the embodiment of the disclosure, as illustrated in FIG. 7, the second compensation film layer 500 may be located on the side of the first substrate 100 facing towards the liquid crystal layer 300, that is, on an inner side of the first substrate 100; alternatively, as illustrated in FIG. 8, the second compensation film layer 500 may also be located on the side of the first substrate 100 facing away from the liquid crystal layer 300, that is, on an outer side of the first substrate 100. In addition, if the second compensation film layer 500 is arranged on the outer side of the first substrate 100, it may facilitate a relatively apparent compensation effect for the final emergent light and achieve an effect of optimizing the viewing angle.

According to the embodiment of the present disclosure, in the display panel according to the embodiment of the disclosure, as illustrated in FIG. 7, it may further comprises: a color film layer 110 located on the side of the first substrate 100 facing towards the liquid crystal layer 300, and a spacer layer 130 located on the side of the color film layer 110 facing towards the liquid crystal layer 300; and the second compensation film layer 500 may be multiplexed as a planarization layer 120 between the color film layer 110 and the spacer layer 130; the first compensation film layer 400 is located between the second compensation layer 500 and the spacer layer 130.

Specifically, in a condition that the second compensation film layer 500 is located on the inner side of the first substrate 100, the second compensation film layer 500 is multiplexed as the planarization layer 120, which can simplify the complexity of the process flow and help to save the production cost.

According to the embodiment of the present disclosure, in the display panel according to the embodiment of the disclosure, in order to ensure that the second compensation film layer 500 which is multiplexed as the planarization layer 120 may function to implement the planarization effect, that is, to fill the uneven of the upper surface of the color film 110, the thickness of the second compensation film layer 500 is required to fall within the range of 0.8 μm~2.5 μm, so as to ensure that it may function to implement the planarization effect. Moreover, a viscosity of the second compensation film layer 500 prior to its curing is required to fall within the range of 1.5 MPs·s~20 MPs·s, so as to ensure a fluidity of the second compensation film layer 500, which may be filled into the uneven gap so as to implement the planarization effect.

According to the embodiment of the present disclosure, in the display panel according to the embodiment of the disclosure, as illustrated in FIG. 8, the second compensation film layer 500 may function as the upper polarizer and be located on the side of the first substrate 100 facing away from the liquid crystal layer 300, which can simplify the complexity of the process flow and help to save the production cost.

Figure 9:
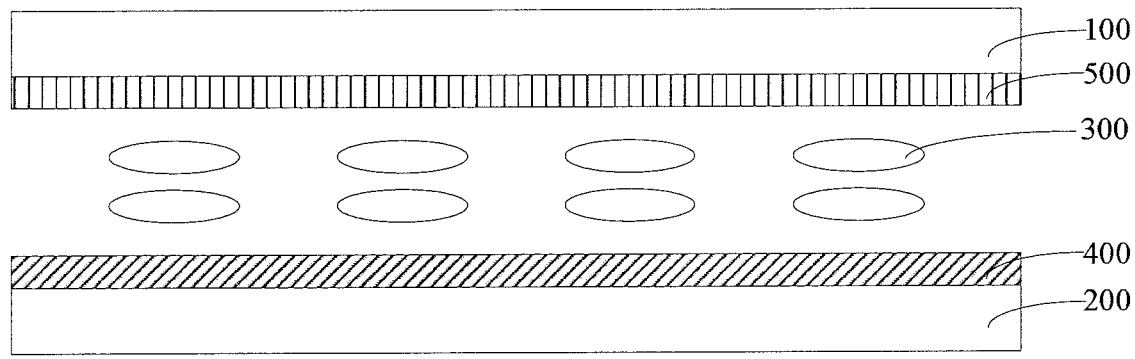
FIG. 9 is a schematic structural view of a display panel having a second compensation film layer, according to still another embodiment of the disclosure.
Figure 10:
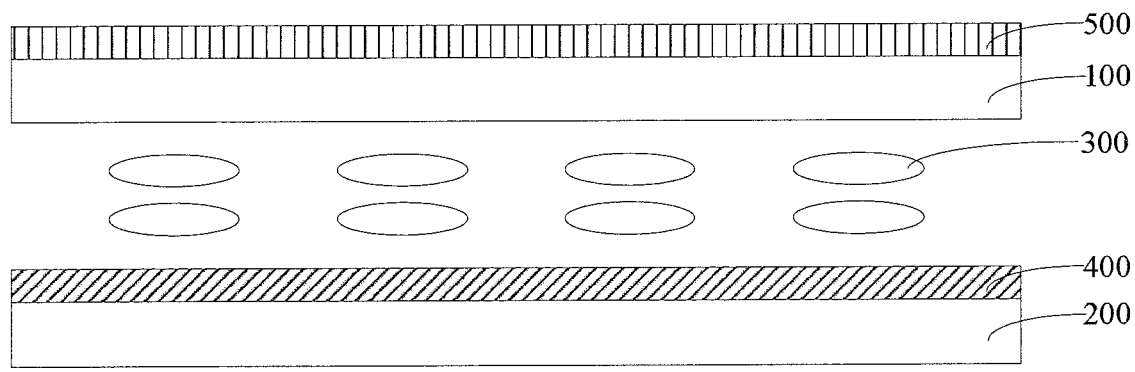
FIG. 10 is a schematic structural view of a display panel having a second compensation film layer, according to yet another embodiment of the disclosure.

According to the embodiment of the present disclosure, in the display panel according to the embodiment of the disclosure, as illustrated in FIG. 9 and FIG. 10, the first compensation film layer 400 and the second compensation film layer 500 may also be located on different sides of the liquid crystal layer 300.

According to the embodiment of the present disclosure, in the display panel according to the embodiment of the disclosure, as illustrated in FIG. 9 and FIG. 10, the first compensation film layer 400 may be located on one side of the second substrate 200 facing towards the liquid crystal layer 300.

As shown in FIG. 9, the second compensation film layer 500 may be located on the side of the first substrate 100 facing towards the liquid crystal layer 300, that is, on the inner side of the first substrate 100; alternatively, as shown in FIG. 10, the second compensation film layer 500 may also be located on the side of the first substrate 100 facing away from the liquid crystal layer 300, that is, on the outer side of the first substrate 100. The second compensation film layer 500 is arranged on the outer side of the first substrate 100, so as to facilitate a relatively apparent compensation effect for the final emergent light and achieve an effect of optimizing the viewing angle.

According to the embodiment of the present disclosure, in the display panel according to the embodiment of the disclosure, as shown in FIG. 10, the second compensation film layer 500 may function as the upper polarizer and be located on the side of the first substrate 100 facing away from the liquid crystal layer 300, so as to simplify the complexity of the process flow and help to save the manufacturing cost.

Figure 13:
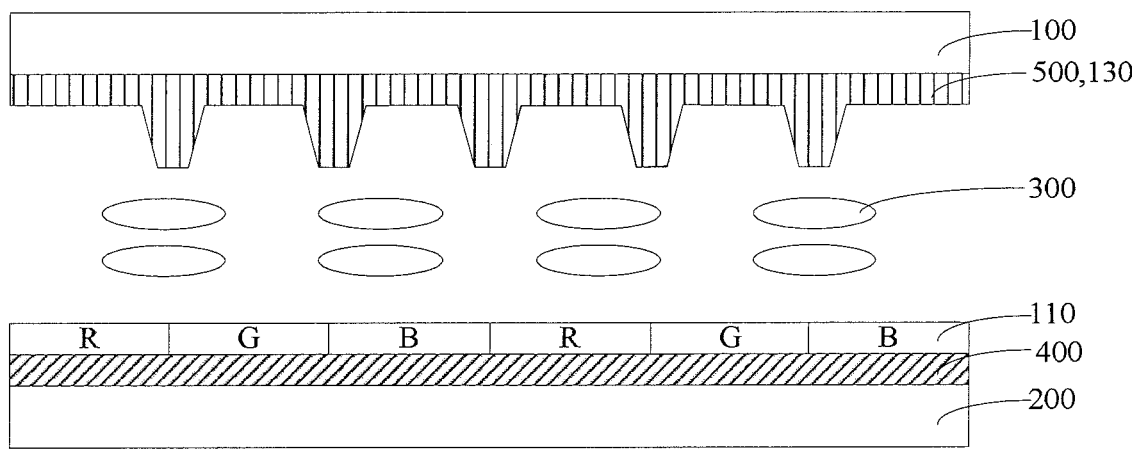
FIG. 13 is a schematic structural view of a display panel having a second compensation film layer, according to one more another embodiment of the disclosure.

According to the embodiment of the present disclosure, in the display panel according to the embodiment of the disclosure, as shown in FIG. 13, in a condition that the second compensation film layer 500 is located on the inner side of the first substrate 100, the second compensation film layer 500 is located on the side of the first substrate 100 facing towards the liquid crystal layer 300, and the second compensation film layer 500 has a plurality of spacers 130 protruding towards the liquid crystal layer 300.

Specifically, the second compensation film layer 500 is multiplexed as a function of the spacer layer 130, so as to save the working procedure of a separate fabrication of the spacer layer, which may simplify the complexity of the process flow and help to save the production cost.

Moreover, in the above display panel according to the embodiment of the present disclosure, as shown in FIG. 13, in a condition that the second compensation film layer 500 is multiplexed as the function of the spacer layer, in order to simplify the complexity of the film layer on one side of the first substrate 100, the color film layer 110 may also be provided on the second substrate 200.

Alternatively, specifically, in a condition that the second compensation film layer 500 is located on the inner side of the first substrate 100, the second compensation film layer 500 may also be multiplexed as the planarization layer, which may simplify the complexity of the process flow, and help to save the production cost.

According to the embodiment of the present disclosure, in the display panel according to the embodiment of the disclosure, in order to ensure that the second compensation film layer 500 which is multiplexed as the planarization layer 120 may function to implement the planarization effect, that is, to fill the uneven of the upper surface of the color film 110, the thickness of the second compensation film layer 500 is required to fall within the range of 0.8 μm~2.5 μm, so as to ensure that it may function to implement the planarization effect. Moreover, a viscosity of the second compensation film layer 500 prior to its curing is required to fall within the range of 1.0 MPs·s 50 MPs·s, so as to ensure the fluidity of the second compensation film layer 500, which can be filled into the uneven gap so as to implement the planarization effect.

According to the embodiment of the present disclosure, in the display panel according to the embodiment of the disclosure, both the first compensation film layer 400 and the second compensation film layer 500 are liquid crystal films so as to reduce the production cost. Of course, the first compensation film layer 400 and the second compensation film layer 500 may alternatively be other materials, without being restricted in this connection herein. It should be noted that, in a condition that the first compensation film layer 400 and the second compensation film layer 500 are both liquid crystal films, their initial orientations will not be changed once determined, which situation is different from the case of the liquid crystal layer 300 in the display panel.

Figure 11:
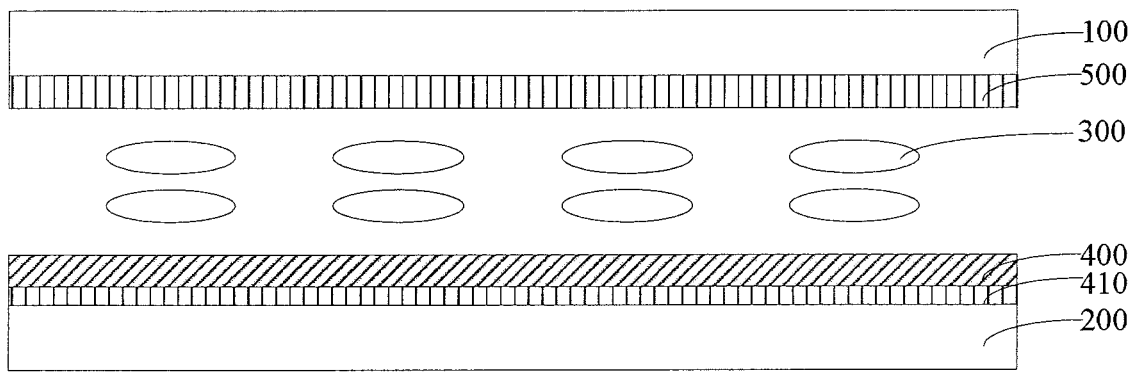
FIG. 11 is a schematic structural view of a display panel having a second compensation film layer, according to still yet another embodiment of the disclosure.
Figure 12:
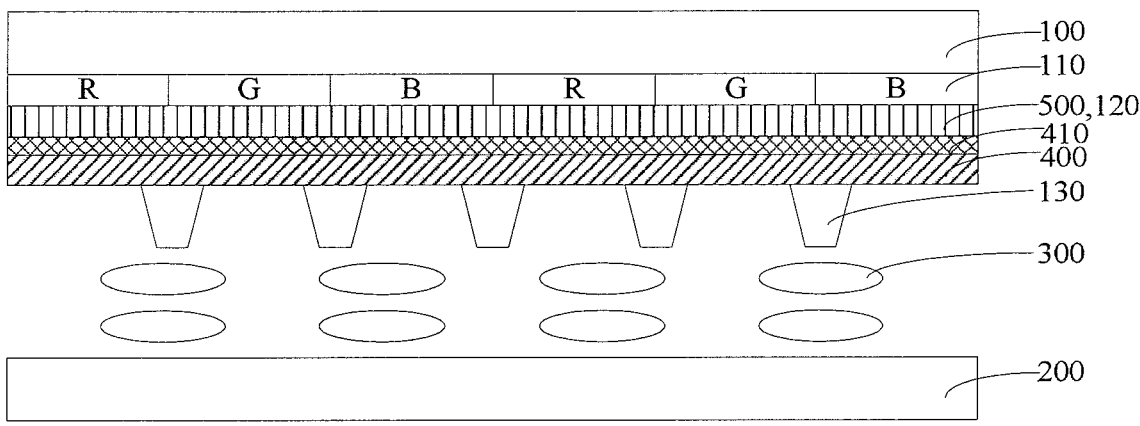
FIG. 12 is a schematic structural view of a display panel having a second compensation film layer, according to even another embodiment of the disclosure.

According to the embodiment of the present disclosure, in the display panel according to the embodiment of the disclosure, in order to ensure that the optical axis direction of the first compensation film layer 400 is perpendicular to the direction of the initial optical axis of the liquid crystal molecules in the liquid crystal layer 300, as shown in FIG. 11 and FIG. 12, it may further comprise: an alignment layer 410 located on the side of the first compensation film 400 facing away from the liquid crystal layer 300 and adjacent to the first compensation film layer 400. Alternatively, the liquid crystal film having the alignment direction may be selected to function as the first compensation film layer 400, and the alignment layer 410 may be omitted to simplify the production process.

Specifically, as shown in FIG. 11, in a condition that the first compensation film layer 400 is located on one side of the second substrate 200 facing towards the liquid crystal layer 300, the alignment layer 410 is located between the first compensation film layer 400 and the second substrate 200; as shown in FIG. 12, in a condition that the first compensation film layer 400 is located on the side of the first substrate 100 facing towards the liquid crystal layer 300, the alignment layer 410 is located between the first compensation film layer 400 and the first substrate 100.

Specifically, some optical properties of the first compensation film layer 400 and the second compensation film layer 500 are listed in table 1 as below. Some optical parameters of a display panel 2 with the first compensation film layer 400 and the second compensation film layer 500 being integrated therein and a common display panel 1 are listed in the table 2 as below. The comparison therebetween shows that these parameters have no obvious change, that is to say, the display panel with the first compensation film layer 400 and the second compensation film layer 500 being integrated therein has no significant decrease in performance.

Based on the same inventive concept, in another aspect of the embodiment of the present disclosure, there is also provided a method of manufacturing the horizontal electric field type display panel, comprising:

Providing a first substrate and a second substrate;

Forming the first compensation film layer having an alignment direction, by coating a liquid containing a material for forming the first compensation film layer, on the first substrate or the second substrate, and by in turn performing a pre-baking on the liquid (i.e., pre-baking process); and Filling a space between the first substrate and the second substrate with the liquid crystal layer.

Specifically, the pre-baking may maintain being performed at 30-100° C. for 5 s-60 min Prior to coating the liquid containing the material for forming the first compensation film, an alignment layer may also be formed. The alignment layer may either be a PI alignment implemented by friction or be an OA alignment, without being limited in this connection herein.

According to the embodiment of the present disclosure, in aforementioned manufacturing method according to the embodiment of the present disclosure, prior to forming an alignment layer on the first substrate or the second substrate, the method further comprises:

Forming a second compensation film layer configured to compensate for a phase delay of a non-axial light, by coating a liquid containing a material for forming the second compensation film layer, on the first substrate or the second substrate, and by in turn performing a pre-baking on the liquid (i.e., pre-baking process). Specifically, the pre-baking may maintain being performed at 30-100° C. for 5 s-60 min.

According to the embodiment of the present disclosure, in aforementioned manufacturing method according to the embodiment of the present disclosure, after performing the pre-baking the liquid, the method further comprises:

Irradiating the liquid for 30 s~60 min, with a ultraviolet light having a wavelength of 365 nm and a light intensity of 0.5 mw/cm$^2$~600mw/cm$^2$, i.e., a first UV irradiation.

TABLE 1

|  | Contrast ratio | Film thickness | Phase delay amount in thickness direction | Birefringence | Viscosity | Solvent percentage |
| --- | --- | --- | --- | --- | --- | --- |
| First compensation film | 6000:1 | 1 μm~5 μm |  | 0.8~2.3 | 1 mPa · s ~15mPa · s | 10%~100% |
| Second compensation film | 7000:1 | 0.5 μm~5 μm | 92 nm~300 nm |  | 1.5 mPa · s~ 20 mPa · s | 10%~100% |

TABLE 2

|  | Transmittance | Viewing angle (left/right/up/down) | Response time | Maximum brightness | Color gamut (CIE1931) | Chromaticity coordinates of white (Wx, WY) |
| --- | --- | --- | --- | --- | --- | --- |
| Display panel 1 | 2.75% | 89/89/89/89 degree | 15.47 ms | 136 nits | 67.7 | 0.293, 0.329 |
| Display panel 2 | 2.73% | 89/89/89/89 degree | 15.43 ms | 135 nits | 67.2 | 0.293, 0.338 |

According to the embodiment of the present disclosure, in aforementioned manufacturing method according to the embodiment of the present disclosure, prior to irradiating the liquid with the ultraviolet light having the wavelength of 365 nm, the method further comprises:

Irradiating the liquid for 30 s~60 min, with a ultraviolet light having a wavelength of 254 nm and a light intensity of 0.5 mw/cm$^2$~600mw/cm$^2$, i.e., a second UV irradiation.

According to the embodiment of the present disclosure, in aforementioned manufacturing method according to the embodiment of the present disclosure, after forming the first compensation film layer and the second compensation film layer, the method further comprises: performing a post-baking (i.e., post-baking process) on the display panel, which may be implemented by heating for 2 min-50 min at 180-280° C.

It is summarized as follows: in the above manufacturing method according to the embodiment of the present disclosure, the process of forming the first compensation film layer may specifically comprise following situations:

1. Forming an alignment layer→coating a liquid containing a material for forming a first compensation film layer-→pre-baking process→post-baking process;
2. Forming an alignment layer→coating a liquid containing a material for forming a first compensation film layer-→pre-baking process→first UV irradiation;
3. forming the alignment layer→coating a liquid containing a material for forming the first compensation film layer→pre-baking process→first UV irradiation→post-baking process;
4. coating a liquid comprising a material for forming a first compensation film→pre-baking process;
5. coating a liquid comprising a material for forming a first compensation film→pre-baking process→first UV irradiation→second UV irradiation;
6. Coating a liquid comprising a material for forming the first compensation film→pre-baking process→first UV irradiation→post-baking process.

It is summarized as follows: in the above manufacturing method according to the embodiment of the present disclosure, the process of forming the second compensation film layer can specifically include the following situations:

1. coating a liquid containing a material for forming a second compensation film→pre-baking process→post-baking process;
2. coating a liquid comprising a material for forming a second compensation film→pre-baking process→first UV irradiation;
3. coating a liquid comprising a material for forming a second compensation film→pre-baking process;
4. coating a liquid comprising a material for forming a second compensation film→pre-baking process→first UV irradiation→second UV irradiation;
5. Coating a liquid comprising a material for forming the second compensation film→pre-baking process→first UV irradiation→post-baking process.

Based on the same inventive concept, in yet another aspect of the embodiment of the disclosure, there is also provided a display device, comprising the above horizontal electric field type display panel according to the embodiment of the disclosure, which may be any product or component with display function such as mobile phone, tablet computer, television, display, laptop computer, digital photo frame, navigator, and the like. The implementation of the display device may refer to the embodiment of the above horizontal electric field type display panel, and the repetition will not be described in detail.

As compared with relevant art, based on the above technical solution, the horizontal electric field type display panel, the method of manufacturing the same, and the display device according to embodiments of the disclosure may have beneficial effects, at least as below:

The above-mentioned horizontal electric field type display panel, the method of manufacturing the same, and the display device according to the embodiment of the present disclosure are provided, with a first compensation film layer between the first substrate and the second substrate, which is configured to compensate for the phase delay of the axial light when the display panel is subjected to a non-uniform external force. As such, when the first substrate and the second substrate are subjected to respective non-uniform external forces, the optical anisotropy will be generated, resulting in that when the polarization state of the transmitted light changes, the first compensation film layer may compensate for the phase delay of the polarized light passing through the liquid crystal layer, such that the light will return to the original polarization state to a certain extent after passing through the first substrate, the second substrate, the liquid crystal layer and the first compensation film layer. As such, most of the light may fail to exit the display panel when it is in dark state, thus improving the problem of light leakage in dark state.

Obviously, those skilled in the art can make various changes and modifications to the disclosure without departing from the spirit and scope of the disclosure. Therefore, if these modifications and variations of the present disclosure fall within the scope of the claims of the present invention and its equivalent technology, the present invention also intends to include these modifications and variations.

What is claimed is:

1. A horizontal electric field type display panel, comprising:
    a first substrate and a second substrate arranged opposite to each other;
    a liquid crystal layer between the first substrate and the second substrate; and
    a single integral first compensation film layer between the first substrate and the second substrate,
    wherein the first compensation film layer is configured to compensate for a phase delay of an axial light in a condition that the display panel is subjected to a non-uniform external force;
    wherein the display panel further comprises a single integral second compensation film layer, which is located on a light-emergent side of the liquid crystal layer and the first compensation film layer and configured to compensate for a phase delay of a non-axial light;
    wherein in response to the first compensation film layer and the second compensation film layer being located on different sides of the liquid crystal layer respectively, the first compensation film layer is located on a side of the second substrate facing towards the liquid crystal layer; and
    wherein the second compensation film layer is located on a side of the first substrate facing away from the liquid crystal layer.

2. The display panel according to claim 1, wherein a direction of an optical axis of the first compensation film layer is parallel to a direction of an initial optical axis of liquid crystal molecules in the liquid crystal layer; and a sum of an optical path difference of the first compensation film layer and an optical path difference of the liquid crystal layer is an integral multiple of a wavelength of an incident light.

3. The display panel according to claim 1, wherein a direction of an optical axis of the first compensation film layer is perpendicular to a direction of an initial optical axis of liquid crystal molecules in the liquid crystal layer; and a difference between an optical path difference of the first compensation film layer and an optical path difference of the liquid crystal layer is an integral multiple of a wavelength of an incident light.

4. The display panel according to claim 1, wherein the first compensation film layer is a +A compensation film layer.

5. The display panel according to claim 1, further comprising:

a color film layer on a side of the first substrate facing towards the liquid crystal layer;

a planarization layer on a side of the color film layer facing towards the liquid crystal layer; and a spacer layer on a side of the planarization layer facing towards the liquid crystal layer;

wherein the first compensation film layer is multiplexed as the planarization layer between the color film layer and the spacer layer.

6. The display panel according to claim 1, wherein the second compensation layer is a +C compensation film layer or a −C compensation film layer.

7. The display panel according to claim 1, wherein in response to the second compensation film being located on a side of the first substrate facing away from the liquid crystal layer, the second compensation film functions as an upper polarizer.

8. The display panel according to claim 1, wherein the second compensation film layer has a plurality of spacers protruding towards the liquid crystal layer.

9. The display panel according to claim 1, wherein both the first compensation film layer and the second compensation film layer are liquid crystal films.

10. The display panel according to claim 9, further comprising: an alignment layer located on the side of the first compensation film facing away from the liquid crystal layer and adjacent to the first compensation film layer.

11. A display device, comprising: the horizontal electric field type display panel according to claim 1.

12. A method of manufacturing the horizontal electric field type display panel according to claim 1, comprising:

providing the first substrate and the second substrate;

forming the first compensation film layer having an alignment direction, by coating a liquid containing a material for forming the first compensation film layer, on the first substrate or the second substrate, and by in turn performing a pre-baking on the liquid; and filling a space between the first substrate and the second substrate with the liquid crystal layer.

13. The method according to claim 12, further comprising:

forming a second compensation film layer configured to compensate for a phase delay of a non-axial light, by coating a liquid containing a material for forming the second compensation film layer, on the first substrate or the second substrate, and by in turn performing a pre-baking on the liquid.

* * * * *